Dec. 20, 1955  W. T. SMITH ET AL  2,727,266
FILM APPLICATOR
Filed Jan. 14, 1953  2 Sheets-Sheet 2
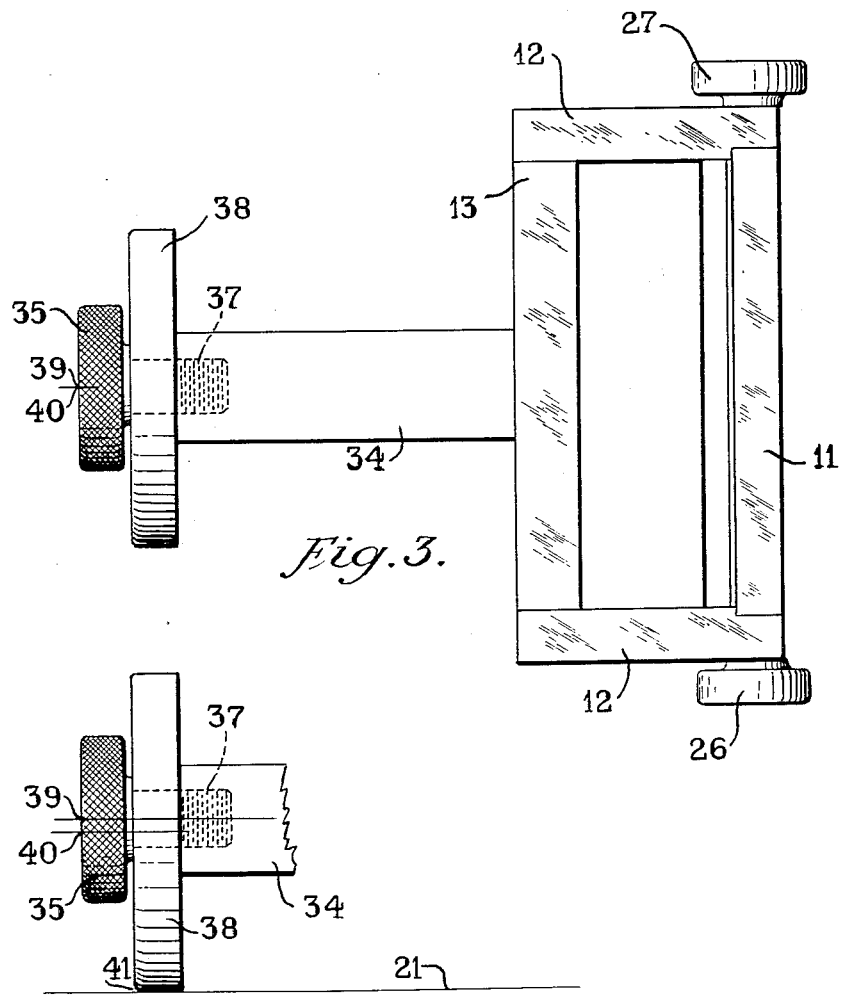
INVENTORS
William T. Smith
Maynard R. Euverard
William A. Weidlich
BY
ATTORNEY

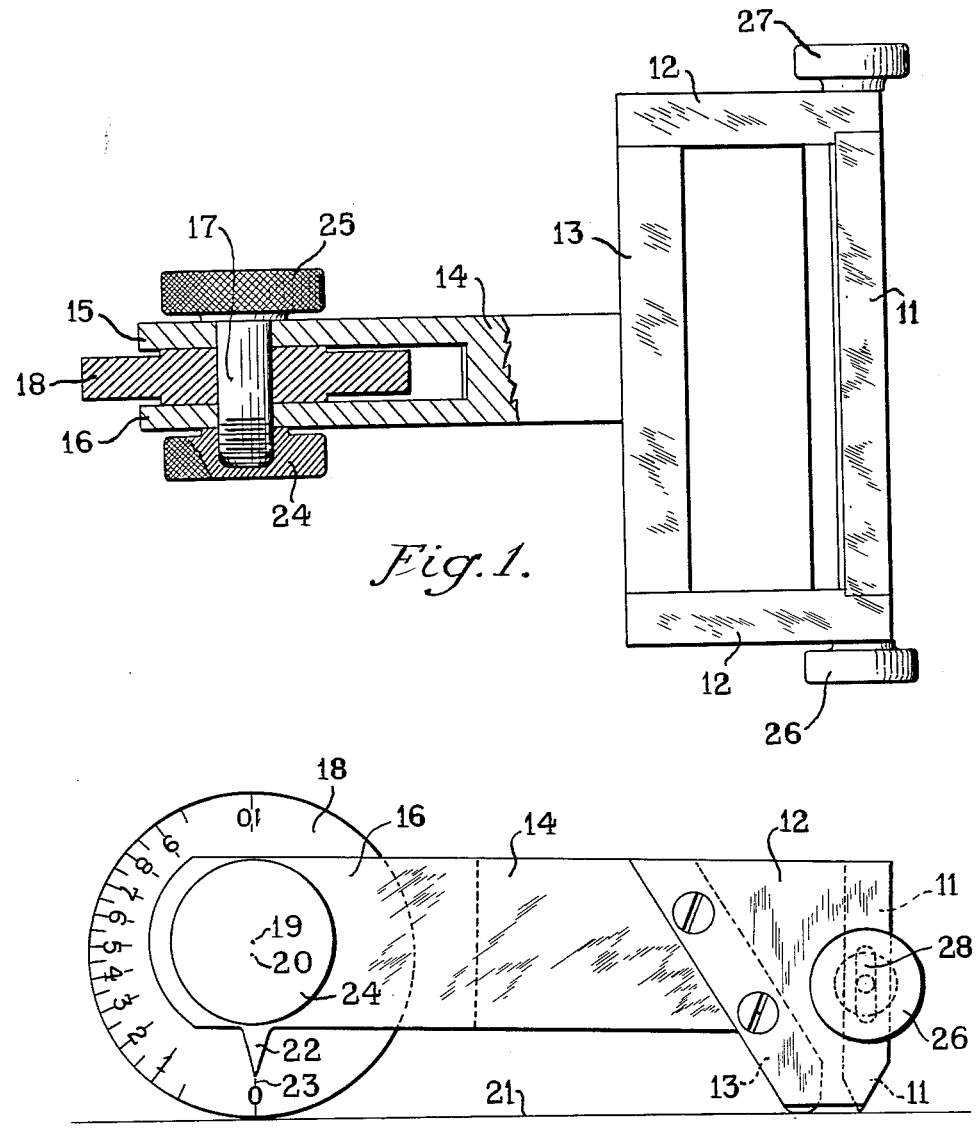

United States Patent Office 2,727,266
Patented Dec. 20, 1955

2,727,266
FILM APPLICATOR

William T. Smith, Fanwood, Maynard R. Euverard, Short Hills, and William A. Weidlich, Plainfield, N. J., assignors to Interchemical Corporation, New York, N. Y., a corporation of Ohio Application January 14, 1953, Serial No. 331,258

5 Claims. (Cl. 15—131)

The present invention relates to a film applicator which is particularly useful in coating non-rigid surfaces with films of uniform and controlled thickness.

One of the factors which are of the utmost concern to the coating industry is the ability of surface coatings to cope with dimensional changes in the substrate, but studies to that effect have been hampered by the absence of suitable means for casting films of uniform and reproducibly controlled thickness onto surfaces, particularly onto non-rigid test panels, such as test panels from metal foil, paper, fabric, or plastic sheets. The ordinary doctor blade fails completely in this instance, not only with respect to any control of film thickness, but chiefly with respect to the uniformity of the applied film. The casting of films onto non-rigid panels is possible by means of the flow-down method at standard inclinations and temperatures. However, this method is limited by a number of factors, such as viscosity and rate of evaporation of solvents contained in the film forming material. Thus, the flow-down method, as a rule, produces films which are not uniform from top to bottom and does not permit controlled variations in film thickness. Moreover, the films deposited in this manner have only a fraction of the thickness of films resulting in commercial production, the investigation of which is of primary interest. Certain wood lacquers, for example, form films of 0.75 to 1.0 mil when cast by means of the flow-down method. In contrast thereto, the same lacquers in commercial production are made into films having a thickness of about 2 mil. Since it appeared that there was a critical film thickness, below which the coatings would show insufficient resistance toward checking or cracking due to dimensional changes in the substrate, in order to investigate the effect of film thickness on the check resistance and other physical properties of the film, it became desirable ot devise means for laying down uniform coatings on non-rigid surfaces that would be reproducible and the thickness of which could be elected at will within relatively wide limits. The herein disclosed film applicator, now described in detail in conjunction with the accompanying drawings, answers the afore-stated need.

Fig. 1 is a plan view, partly sectional, of one embodiment of the device,

Fig. 2 is an elevation of the said embodiment,

Fig. 3 is a plan view of another embodiment of the device, and

Fig. 4 is an elevation of the front part of the device shown in Fig. 3.

Referring in more detail to the drawings, the numeral 11 represents the applicator blade, whose main function it is to govern the thickness of the applied film. For our purposes, we find a blade most practical which is 2 inch. long, 1.125 inch. wide, 0.25 inch thick and is tapered to an edge at 60° angles. Adjacent to the applicator blade, to form a well for the film producing material with the blade and with the end plates 12, is the pressure draw-down bar 13, having an effective length identical with that of the applicator blade. The width of the pressure draw-down bar preferably exceeds somewhat that of the applicator blade in order to have its top portion in one plane with the top portion of the applicator blade; this because of the fact that the draw-down bar is arranged at an angle of, say, 60° toward the applicator blade in order to form part of the above-mentioned well and to contact and smooth the surface, upon which the film is to be applied, just ahead of the applicator blade. Moreover, since the bottom portion of the pressure bar is to act as a fulcrum as will be explained later in the specification, it is desirable to have the bottom portion rounded.

The device shown in Figs. 1 and 2 is made adjustable with respect to the film thickness of the material applied to the surface by means of a lever 14, one end of which is secured to the pressure draw-down bar as shown. The other extremity of this lever splits into two arms 15 and 16. Held between these two arms is the shaft 17, retained by bearings accurately machined into the arms. Fixedly attached to the shaft is the eccentric wheel 18 which, depending upon the rotary position given thereto, raises or lowers the lever 14 about the foot of the draw-down bar 13 as a fulcrum, which, in turn, decreases or increases the clearance between the surface and the edge of the applicator blade 11.

As a practical example, if the wheel 18 is 1.5 inch. in diameter and is mounted on the shaft in such a manner that the axis of rotation of the wheel is perpendicularly offset for a distance of 0.05 inch from the true axis of the wheel and if, furthermore, the distance from the point of contact between the wheel and the base to the foot of the draw-down bar is 2.5 inch., and the distance from the foot of the draw-down bar to the edge of the blade is 0.25 inch, any raising or lowering of the shaft 17 and of the lever 14 for a given distance will lower or raise the blade for one-tenth of this distance. Thus, the device is continuously adjustable with respect to the film thickness of the applied material, and can be made to cover any given range of gate clearance (which, depending upon the material used, may or may not be exactly identical with the thickness of the resulting film).

According to the foregoing example, if the axis of rotation 19 of the wheel 18 is placed in a vertical plane with, and below the, true axis 20 of the wheel, and the point of contact between the wheel and the base 21 is given the reference numeral 19, the circumference of the wheel can be calibrated with a scale from 0 to 10, in which the "0" point is diametrically opposite to the highest point 19, whereby the latter, under the afore-stated conditions, indicates a 0.1 inch drop of the bar 14 about the fulcrum point and, consequently, a 0.01 inch rise of the blade edge in relation to the draw-down bar. Therefore, the herein exemplified instrument has a range from zero to 10 mils gate clearance. In determining the intermediary points of the scale, it is to be noted, however, that the distances at the circumference of the wheel vary as a cosine function. Hence, at a 60° angle from zero is the point indicating a rise of the blade edge amounting to 2.5 mils, at 90° a rise of 5 mils, at 120° a rise of 7.5 mils and at 180° a rise of 10 mils. This angular relation is further illustrated in the tabulation below, indicating the calibration of wheel 18.

| Half Mark | Full Mark | Included Angle from Zero |
|---|---|---|
| .5 |   | 25° 50' |
|   | 1 | 36° 52' |
|   |   | 45° 64' |
|   | 2 | 53° 07' |
|   |   | 60° 00' |
|   | 3 | 60° 25' |
|   |   | 72° 32' |
|   | 4 | 78° 27' |
|   |   | 84° 15' |
|   | 5 | 90° 00' |
|   |   | 95° 45' |
|   | 6 | 101° 33' |
|   |   | 107° 30' |
|   | 7 | 113° 35' |
|   |   | 120° 00' |
|   | 8 | 126° 53' |
|   |   | 134° 26' |
|   | 9 | 143° 08' |
|   |   | 154° 10' |
|   | 10 | 180° 00' |

It is obvious that the center of rotation 19 rather than the true center 20 of the wheel must be considered as the reference point for laying off the angles for the calibration marks.

For an exact setting of the device, we find it practical to provide the arm 16 with a pointer 22, and the calibration at the wheel 18 with reference lines, such as the reference line 23. In order to fix the chosen setting, the shaft 17 is threaded at both ends, to receive the screw caps 24 and 25, by means of which the said shaft can be locked against the arms 15 and 16, respectively.

In order to prepare for the application of a film, the device is placed on a plane surface with the "zero" mark at the lowermost position so that the reference line and the pointer coincide with each other. The bolts 26 and 27, each passing through a slot in one of the end plates 12 and being provided for the purpose of fastening the blade 11 at a given position between the end plates, are first unfastened and then again secured in position after the blade has been brought into firm contact with the surface. If it is desired, for example, to apply a gate clearance of 3 mils, the wheel 18 is rotated until the reference line of the mark "3" touches the tip of the pointer 22, whereupon the wheel is locked in position by means of the screw caps 24 and 25. As a result of this resetting of the wheel 18, the shaft end of the lever 14 is lowered 0.03 inch and the edge of the blade 11 is raised 0.003 inch from the surface of the base 21. After placing the device onto a strip or panel of the material to which a film of a given thickness is to be applied, say of a thickness resulting from a gate clearance of 3 mils, the aforementioned well, formed between the blade 11, the end plates 12, and the draw-down bar 13, is filled with a viscous, film forming liquid and the device is slidingly drawn over that surface area of the strip on panel which is to be covered by the film; whereby care is to be taken that the draw-down bar 13 and the wheel 18 are always in firm contact with the sheet.

A slight inaccuracy accrues in forming a film by means of the device shown in Figs. 1 and 2, due to a minute variation in the distance between the draw-down bar 13 and the wheel 18 as the latter is rotated. In a device incorporating the afore-illustrated dimensions and range, this error is insignificant. If a much wider range of gate clearances is to be incorporated in the device, it is preferable to employ the embodiment illustrated in Figs. 3 and 4, which eliminates this error completely.

As shown in Fig. 3, the arrangement of the applicator blade, pressure draw-down bar and end plates is the same as in the afore-described embodiment. However, the split lever 14 is replaced by a lever bar 34, being internally threaded at the free end in order to accommodate the threaded portion 37 of a screw cap 35, which provides a shaft for the eccentric wheel 38 and permits to lock the wheel in position. The said wheel, having the axis of rotation 39 offset against the true axis 40 in the same manner as the previously described wheel 18, differs from the latter only in its position with respect to the blade and the draw-down bar, and in having a rounded rim 41 to facilitate the sliding movement of the device over the surface which is to be coated and to retain a constant distance between the center of rotation and the base, regardless of the degree of the inclination of the wheel.

It is noteworthy that the range of gate clearance of the afore-described devices can be readily increased in a simple and practical manner. If, for example, in a device providing for a gate clearance from 0 to 10 mils, the bolts 26 and 27 are unfastened, a 10 mil shim is placed under the edge of the blade while the eccentric wheel is in "zero" position, and the said bolts are fastened again after the blade has been brought into firm contact with the shim, the gate clearances of the device range now from 10 to 20 mils.

We claim:
1. A film applicator comprising two parallel plates holding between themselves a knife blade in substantially vertical position with the edge directed toward a work surface and, in an inclined position toward the knife blade, a pressure draw-down bar having a rounded bottom close to the edge of the knife blade, the arrangement of the said plates, knife blade and draw-down bar providing a well adapted to retain a viscous, film-forming liquid, a lever attached to the said draw-down bar and extending therefrom substantially parallel to the work surface, means attached to the free end of the said lever which, contacting the work surface, allow the said free end of the lever to be lowered when both the draw-down bar and knife blade are in contact with the work surface and thereby raise the said knife blade about the rounded bottom of the draw-down bar as a fulcrum to a position of maximum clearance between the edge of the said knife blade and the work surface and a calibration in conjunction with the said means indicating the degree of leverage in appropriate units.

2. A film applicator according to claim 1, in which the said knife blade is provided with bolts passing through slots cut into the said plates to permit raising and lowering of the knife blade.

3. A film applicator comprising two parallel plates holding between themselves a knife blade in substantially vertical position with the edge directed toward a work surface and, in an inclined position toward the knife blade, a pressure draw-down bar having a rounded bottom close to the edge of the knife blade, the arrangement of the said plates, knife blade and pressure draw-down bar forming a well adapted to retain a viscous, film-producing liquid, a lever attached to center portion of the said draw-down bar and extending therefrom substantially parallel to the work surface, attached to the free end of the said lever an eccentric wheel which, upon being turned from the highest position to the lowest position, rotates the said lever about the round bottom of the said draw-down bar and thereby raises the said knife blade from a position in contact with the work surface to a position of maximum clearance between the edge of the said knife blade and the work surface, the degree of clearance depending, at every position of the said wheel, upon the diameter of the wheel, the eccentricity and the ratio between the distances from the bottom of the said draw-down bar to the base of the wheel and to the knife edge, a calibration at the rim of the said wheel in appropriate units, and means for locking the said wheel in position.

4. A film applicator according to claim 3, in which the free end of the said lever splits into two arms, retaining between themselves the said eccentric wheel in a position perpendicular to the said knife blade.

5. A film applicator according to claim 3, in which the said eccentric wheel has a rounded forward rim edge to permit the wheel to be slid in the line of the lever and is attached to the free end of the said lever in a position parallel to the said knife blade.

References Cited in the file of this patent

UNITED STATES PATENTS

| | | |
|---|---|---|
| 556,302 | Carver | Mar. 10, 1896 |
| 677,574 | Huestis | July 2, 1901 |
| 2,376,243 | Fraser | May 15, 1945 |